(12) United States Patent
Harami et al.

(10) Patent No.: US 6,682,276 B2
(45) Date of Patent: Jan. 27, 2004

(54) MACHINE TOOL

(75) Inventors: Toshiro Harami, Yamatokoriyama (JP); Michio Watanabe, Yamatokoriyama (JP); Toshihide Kamei, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 253 days.

(21) Appl. No.: 09/975,988

(22) Filed: Oct. 15, 2001

(65) Prior Publication Data

US 2002/0051687 A1 May 2, 2002

(30) Foreign Application Priority Data

Oct. 26, 2000 (JP) .......................... 2000-326366

(51) Int. Cl.[7] ................................ B23C 9/00
(52) U.S. Cl. ...................... 409/134; 74/608; 408/89; 160/202; 160/223; 409/137
(58) Field of Search .................... 408/56, 89, 234, 408/241 G; 74/608, 609; 409/134, 137, 135, 136, 235; 29/DIG. 50, DIG. 56, DIG. 60, DIG. 94, DIG. 102; 160/202, 222, 223

(56) References Cited

U.S. PATENT DOCUMENTS 5,611,137 A * 3/1997 Braun .......................... 29/560
5,882,158 A * 3/1999 Lechleiter et al. ............ 409/146
2003/0113179 A1 * 6/2003 Yasumatsuya ............... 409/137
2003/0143048 A1 * 7/2003 Sugata et al. ................ 409/137

FOREIGN PATENT DOCUMENTS

| JP | 2-279249 | * 11/1990 |
| JP | 10-328968 | 12/1998 |

* cited by examiner

*Primary Examiner*—Daniel W. Howell
(74) *Attorney, Agent, or Firm*—Westerman, Hattori, Daniels & Adrian, LLP

(57) ABSTRACT

A machine tool is provided which is constructed so that a table pivot mechanism and cables such as a power supply line connected to the pivot mechanism are protected from chips and a coolant. The machine tool comprises: a column movable along the X-axis on a bed (11); a main spindle (12) supported by the column via a spindle head and vertically movable along the Y-axis; and a rotatable table (13) which is movable back and forth with respect to the main spindle (12) along the Z-axis on the bed (11). The table (13) is pivotally supported by a table frame which is movable along the Z-axis along slideways provided on the bed (11). A pivot mechanism such as including a servo motor and a reduction gear mechanism for pivoting the table (13) is provided on an outer side of the table frame. The bed (11) has a center trough in which a chip conveyer (18) is provided. The slideways and the table pivot mechanism are completely separated from a machining space by movable covers (22).

10 Claims, 5 Drawing Sheets

MACHINE TOOL

BACKGROUND OF THE INVENTION

1. Field of the Invention

The present invention relates to a machine tool having a table adapted to move back and forth with respect to a main spindle on a bed with a workpiece mounted thereon, more particularly to a machine tool having a table adapted to pivot up and down about a pivot shaft extending perpendicularly to the direction of the movement of the table.

2. Description of the Prior Art

One example of a machine tool of the aforesaid type is a vertical machining center 50 as shown in FIG. 5. As shown, the vertical machining center 50 includes a saddle 53 movable back and forth along the X-axis on a column 52 provided upright on a bed 51, a spindle head 54 attached to the saddle 53 and vertically movable along the Z-axis, and a rotatable table 55 which is movable back and forth along the Y-axis on the bed 51. The table 55 is supported pivotally about a pivot shaft extending along the X-axis by a table frame 56 which is movable back and forth along the Y-axis along slideways 57 provided on the bed 51.

The bed 51 has a center trough 51a extending along the Y-axis between the slideways 57, and a chip conveyer is provided in the center trough 51a. Therefore, chips generated by machining of the workpiece fall within the center trough 51a and transported away from a machining space by the chip conveyer.

Extendible covers 58 for covering the slideways 57 are attached to the table frame 56 which is movable back and forth along the Y-axis along the slideways 57 on the bed 51, so that the chips generated by the machining of the workpiece are prevented from adhering on the slideways 57.

In the vertical machining center 50, the table 55 per se is adapted to move along the Y-axis, so that a pivot mechanism such as a reduction gear mechanism and a servo motor for rotating the pivot shaft fixed to the table 55 should be mounted on the table frame 56. Inevitably, cables such as power supply lines for supplying electric power to the pivot mechanism and the servo motor are located within the machining space where the chips are generated. The pivot mechanism including the reduction gear mechanism and the servo motor attached to the table frame 56 may be covered with a cover, but it is impossible to perfectly prevent intrusion of a coolant and the chips.

In order to assuredly introduce the chips generated by the machining of the workpiece into the chip conveyer, the coolant may be sprayed over the periphery of the center trough 51a and the table frame 56. In such a case, there is a high possibility that a cable cover accommodating the cables is exposed to the coolant. This reduces the service life of the cable cover, requiring replacement thereof every several years.

It is therefore an object of the present invention to provide a machine tool which is constructed so that a table pivot mechanism and cables such as power supply lines are protected from chips and a coolant.

SUMMARY OF THE INVENTION

In accordance with the present invention to achieve the aforesaid object, there is provided a machine tool of a center trough structure, which comprises: a bed having a trough provided in a widthwise middle portion thereof, and slideways provided thereon on widthwise opposite sides of the trough; a chip conveyer provided in the trough; a rotatable table; a table frame supporting the table pivotally about a pivot axis and movable back and forth along the slideways perpendicularly to the pivot axis of the table on the bed; a pivot mechanism provided on an outer side of the table frame for pivoting the table; and covers attached to the table frame and adapted to be partly extended and partly contracted in directions of the movement of the table frame for covering the slideways and the pivot mechanism.

In the machine tool having the aforesaid construction, the covers adapted to be partly extended and partly contracted in the directions of the movement of the table frame are attached to the table frame so as to cover the table frame slideways and the table pivot mechanism provided on the outer side of the table frame. Therefore, the table pivot mechanism and the table frame slideways are located outside a machining space defined between the covers thereby to be perfectly protected from chips and a coolant in the machining space.

Since the table pivot mechanism is located outside the machining space defined between the covers, cables such as a power supply line connected to a servo motor of the pivot mechanism can be routed outside the machining space. Therefore, not only the pivot mechanism but also the cables can perfectly be protected from the chips and the coolant.

The foregoing and other objects, features and effects of the present invention will become more apparent from the following description of the preferred embodiments with reference to the attached drawings.

DETAILED DESCRIPTION OF THE PREFERRED EMBODIMENTS

Figure 1:
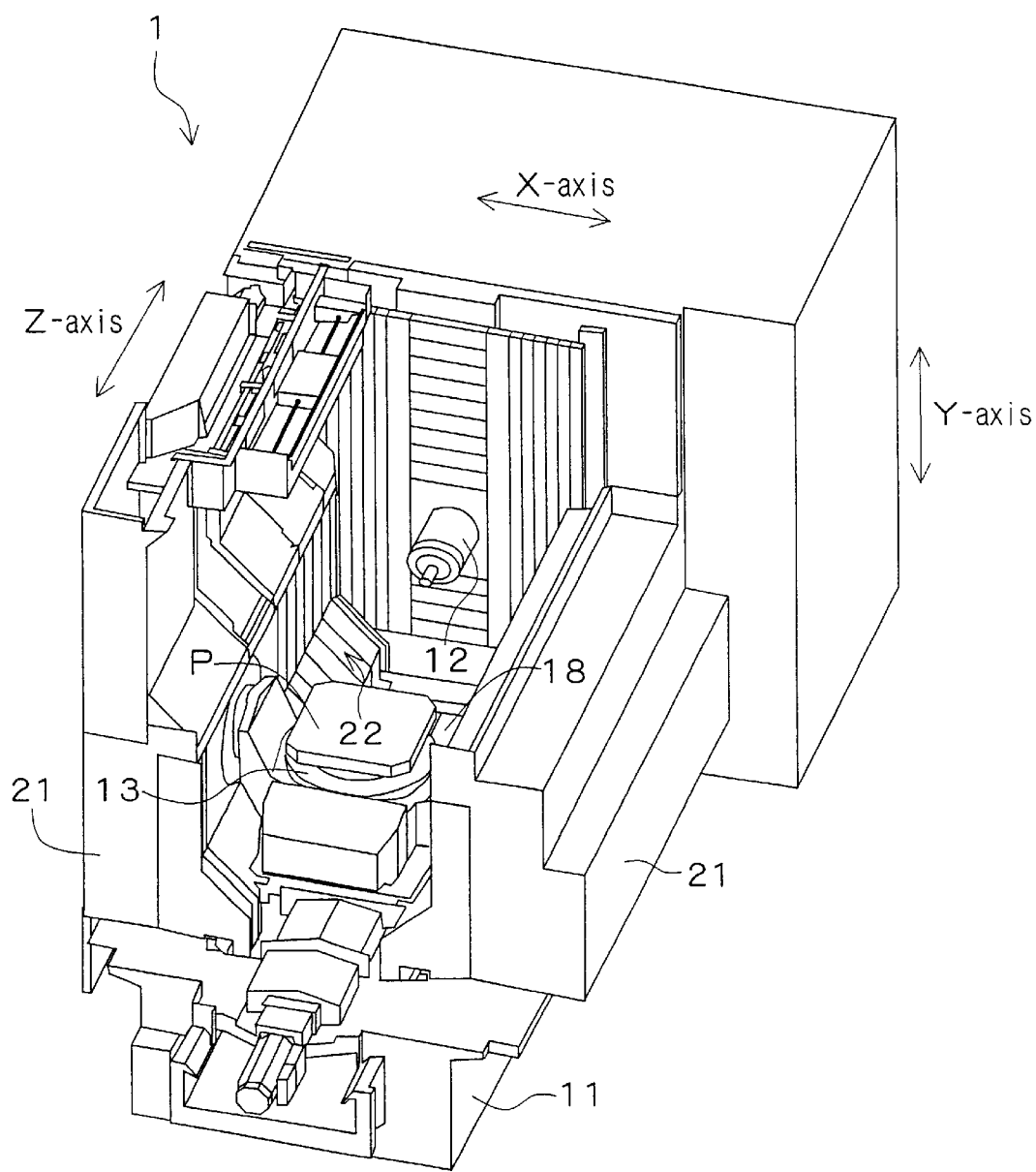
FIG. 1 is a perspective view illustrating a machine tool according to one embodiment of the present invention.
Figure 2:
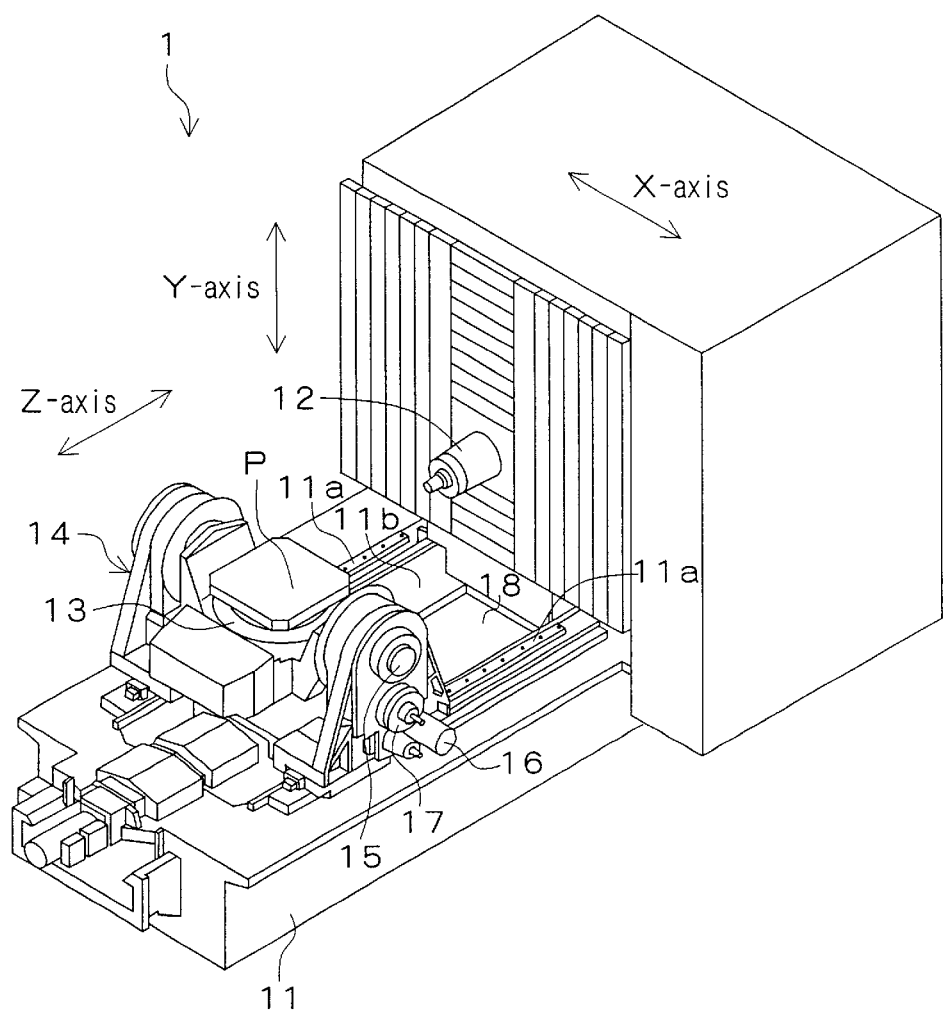
FIG. 2 is a perspective view illustrating the machine tool with stationary covers and movable covers being removed therefrom.

An embodiment of the present invention will hereinafter be described with reference to the attached drawings. As shown in FIGS. 1 and 2, a horizontal machining center 1 includes: a bed 11; a column (not shown) provided at one end of the bed 11 and movable along the X-axis on the bed 11; a main spindle 12 supported by the column via a spindle head and vertically movable along the Y-axis; and a table 13 having a generally U-shaped cross section and movable back and forth with respect to the main spindle 12 along the Z-axis on the bed 11. The table 13 rotatably retains a palette P with a workpiece being fixed thereon.

Figure 3:
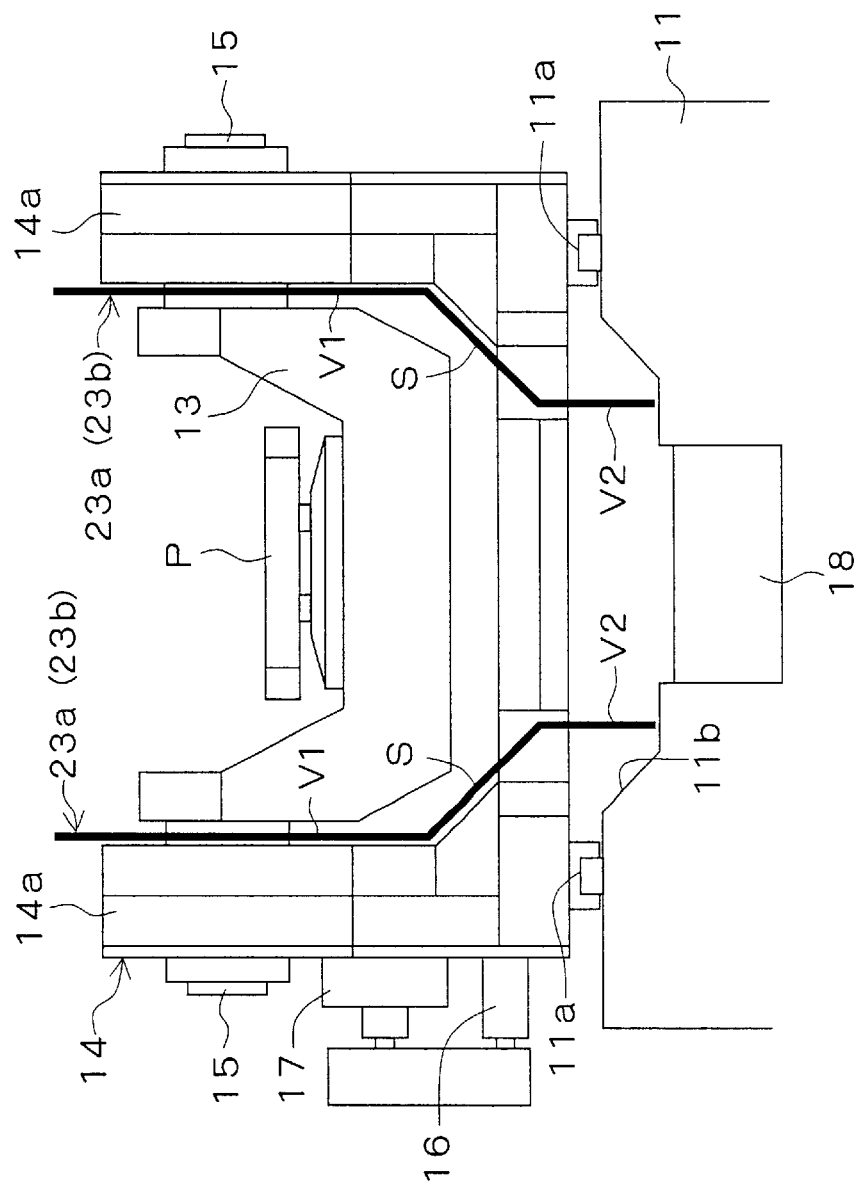
FIG. 3 is a schematic diagram for explaining where the movable covers are located in the machine tool.

As shown in FIGS. 2 and 3, the table 13 is supported pivotally about a pivot shaft 15 extending along the X-axis by a table frame 14 which is movable back and forth along the Z-axis along a pair of slideways 11a provided on the bed 11. A pivot mechanism such as including a reduction gear mechanism 17 and a servo motor 16 for rotating the pivot shaft 15 fixed to the table 13 is provided on an outer side of one of support portions 14a of the table frame 14 which supports the pivot shaft 15.

A center trough 11b is provided between the pair of slideways 11a on an upper surface of the bed 11 as extending along the Z-axis, and a chip conveyer 18 for transporting chips away to the outside is provided in the center trough 11b.

Figure 4A:
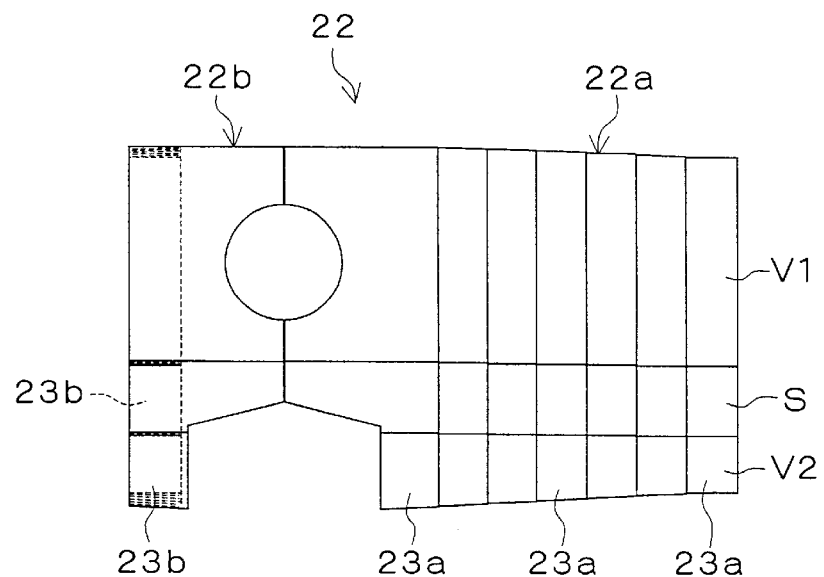
FIGS. 4A and 4B are diagrams illustrating states of the movable covers when a table frame is located at a rear end (on the side of a set up region) and when the table frame is located at a front end (on the side of a main spindle), respectively.
Figure 4B:
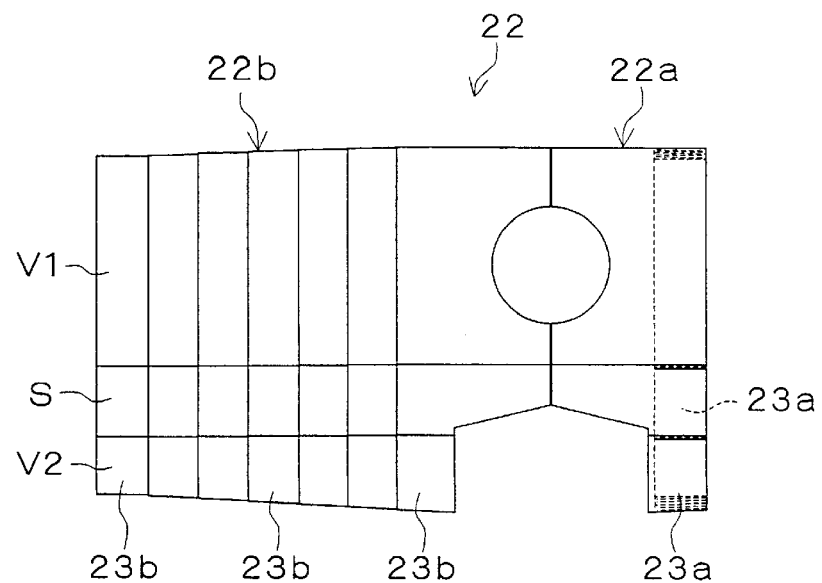
Figure 5:
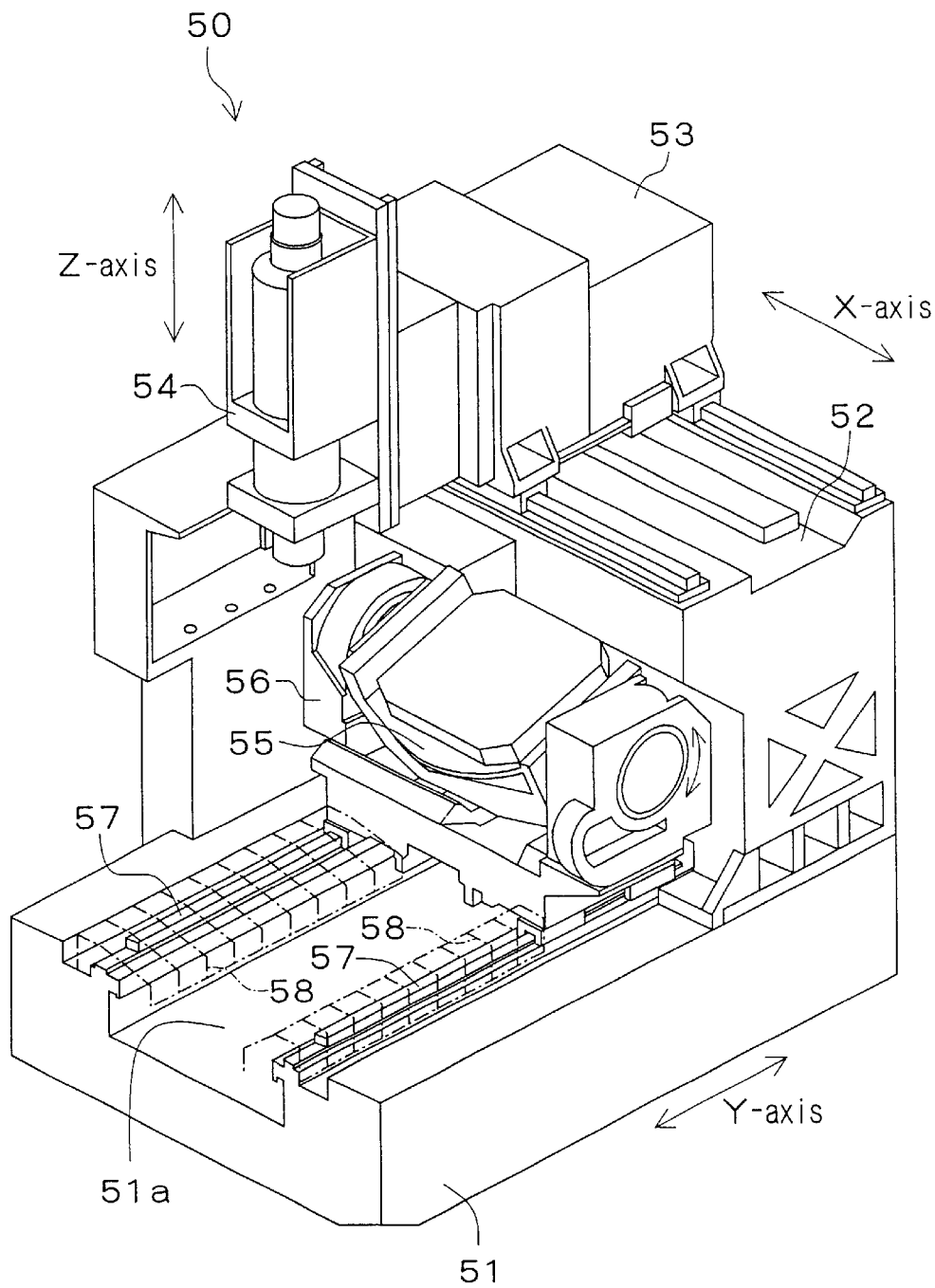
FIG. 5 is a perspective view illustrating a conventional machine tool.

As shown in FIG. 1, the horizontal machining center 1 further includes stationary covers 21 provided on opposite sides of the bed 11 to entirely cover outer sides of the table frame 14 movable along the Z-axis on the bed 11, and movable covers 22 provided on inner sides of the stationary covers 21 to define a machining space therebetween and adapted to be partly extended and partly contracted. As shown in FIGS. 4A and 4B, the movable covers 22 each include a front cover portion 22a extending from the table frame 14 to a front end of the bed 11 (on the side of the main spindle) and a rear cover portion 22b extending from the table frame 14 to a rear end of the bed 11 (on the side of a set up region).

As shown in FIGS. 4A and 4B, the front cover portion 22a and the rear cover portion 22b each include a plurality of cover pieces 23a, 23b which are supported slidably along the Z-axis. Two of the cover pieces 23a, 23b located at opposite ends of each of the movable covers 22 are respectively fixed to the stationary covers 21 or to inner sides of the support portions 14a of the table frame 14.

When the table frame 14 moves to the rear end (to the side of the set up region), the front cover portions 22a are extended and the rear cover portions 22b are contracted as shown in FIG. 4A. When the table frame 14 moves to the front end (to the side of the main spindle) on the contrary, the front cover portions 22a are contracted and the rear cover portions 22b are extended as shown in FIG. 4B. Therefore, the movable covers 22 constantly define the machining space therebetween over the entire movement range of the table frame 14 irrespective of the position of the table frame 14.

As shown in FIG. 3, the cover pieces 23a, 23b each comprise a curved metal plate including an upper vertical portion V1 extending along the inner side of the support portion 14a of the table frame 14, a slant portion S extending obliquely inward and downward from a lower edge of the upper vertical portion V1, and a lower vertical portion V2 extending from a lower edge of the slant portion S to the bottom of the center trough 11b. Therefore, the slideways 11a provided on the bed 11 and the table pivot mechanism including the servo motor 16 and the reduction gear mechanism 17 attached to the outer side of the support portion 14a of the table frame 14 are completely separated from the machining space by the front cover portions 22a and the rear cover portions 22b respectively constituted by the cover pieces 23a and 23b.

By thus providing the movable covers 22 to cover the table frame slideways 11a provided on the bed 11 and the table pivot mechanism provided on the outer side of the support portion 14a of the table frame 14 in the horizontal machining center 1, the slideways 11a and the pivot mechanism are completely separated from the machining space. Therefore, the slideways 11a and the pivot mechanism can perfectly be protected from chips generated in the machining space by machining of the workpiece and from a coolant sprayed over the periphery of the center trough 11b and the table frame 14 for assuredly introducing the chips into the chip conveyor 18, unlike the conventional machine tool in which only the slideways provided on the bed are covered with the covers.

Since the table pivot mechanism is located outside the machining space defined between the movable covers 22, cables such as a power supply line connected to the servo motor 16 and the like of the pivot mechanism can be routed outside the machining space. Therefore, not only the table pivot mechanism but also the cables can perfectly be protected from the chips and the coolant.

The movable covers 22 each extend vertically upward from the center trough 11b though having the slant portion. Therefore, the chips generated in the machining space are assuredly introduced along surfaces of the movable covers 22 into the center trough 11b. Where the coolant is sprayed to introduce the chips into the center trough 11b, there is no need to use the coolant in a great amount. Thus, the consumption of the coolant can be minimized.

The embodiment described above is directed to the horizontal machining center, but the inventive machine tool is not limited to the horizontal machining center. The present invention is applicable to any of machine tools of a center trough structure, in which a table frame pivotally supporting a rotatable table is adapted to move back and forth perpendicularly to a table pivot shaft on a bed, and a chip conveyer for transporting chips away is provided in a trough provided in a widthwise middle portion of the bed.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A machine tool of a center trough structure, comprising:
   a bed having a trough provided in a widthwise middle portion thereof, and slideways provided thereon on widthwise opposite sides of the trough;
   a chip conveyer provided in the trough;
   a rotatable table;
   a table frame supporting the table pivotally about a pivot axis and movable back and forth along the slideways perpendicularly to the pivot axis of the table on the bed;
   a pivot mechanism provided on an outer side of the table frame for pivoting the table; and
   covers attached to the table frame and adapted to be partly extended and partly contracted in directions of the movement of the table frame for covering the slideways and the pivot mechanism.

2. A machine tool as set forth in claim 1, wherein the covers respectively extend upward from widthwise opposite sides of the trough.

3. A machine tool as set forth in claim 1, wherein the covers each comprise a front cover portion extending from the table frame to a front end of the bed and a rear cover portion extending from the table frame to a rear end of the bed.

4. A machine tool as set forth in claim 2, wherein the covers each comprise a front cover portion extending from the table frame to a front end of the bed and a rear cover portion extending from the table frame to a rear end of the bed.

5. A machine tool as set forth in claim 3, wherein the front cover portion and the rear cover portion each comprise a plurality of cover pieces slidably supported.

6. A machine tool as set forth in claim 4, wherein the front cover portion and the rear cover portion each comprise a plurality of cover pieces slidably supported.

7. A machine tool as set forth in claim 5,
wherein stationary covers are provided on opposite sides of the bed to entirely cover outer sides of the table frame movable back and forth on the bed;
wherein two of the cover pieces located at opposite ends of each of the covers are fixed respectively to the stationary covers or to the table frame.

8. A machine tool as set forth in claim 6,
wherein stationary covers are provided on opposite sides of the bed to entirely cover outer sides of the table frame movable back and forth on the bed;
wherein two of the cover pieces located at opposite ends of each of the covers are fixed respectively to the stationary covers or to the table frame.

9. A machine tool as set forth in claim 5, wherein the cover pieces each comprise a curved metal plate including an upper vertical portion extending along an inner side of the table frame, a slant portion extending obliquely inward and downward from a lower edge of the upper vertical portion, and a lower vertical portion extending from a lower edge of the slant portion to the bottom of the center trough.

10. A machine tool as set forth in claim 6, wherein the cover pieces each comprise a curved metal plate including an upper vertical portion extending along an inner side of the table frame, a slant portion extending obliquely inward and downward from a lower edge of the upper vertical portion, and a lower vertical portion extending from a lower edge of the slant portion to the bottom of the center trough.

* * * * *